(12) United States Patent
Hwang et al.

(10) Patent No.: US 12,013,591 B2
(45) Date of Patent: Jun. 18, 2024

(54) OPTICAL IMAGING SYSTEM

(71) Applicant: Samsung Electro-Mechanics Co., Ltd., Suwon-si (KR)

(72) Inventors: Seong Ho Hwang, Suwon-si (KR); Hyuk Joo Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 141 days.

(21) Appl. No.: 17/110,597

(22) Filed: Dec. 3, 2020

(65) Prior Publication Data

US 2021/0088754 A1 Mar. 25, 2021

Related U.S. Application Data

(63) Continuation of application No. 15/273,167, filed on Sep. 22, 2016, now Pat. No. 10,884,217.

(30) Foreign Application Priority Data

Jan. 26, 2016 (KR) .................. 10-2016-0009149

(51) Int. Cl.
*G02B 3/02* (2006.01)
*G02B 9/62* (2006.01)
(Continued)

(52) U.S. Cl.
CPC ............... *G02B 9/62* (2013.01); *G02B 13/04* (2013.01); *G02B 5/005* (2013.01); *G02B 5/208* (2013.01)

(58) Field of Classification Search
CPC .......... G02B 5/005; G02B 5/208; G02B 9/62; G02B 13/04; G02B 13/0045
(Continued)

(56) References Cited

U.S. PATENT DOCUMENTS 9,581,791 B1 2/2017 Liu et al.
2004/0125469 A1 7/2004 Miyano
(Continued)

FOREIGN PATENT DOCUMENTS

CN 101285928 A 10/2008
CN 104122645 A 10/2014
(Continued)

OTHER PUBLICATIONS

Chinese Office Action dated Apr. 2, 2020, in counterpart Chinese Patent Application No. 201610916160.X (9 pages in English, 7 pages in Chinese).
(Continued)

*Primary Examiner* — Mahidere S Sahle
(74) *Attorney, Agent, or Firm* — NSIP Law

(57) ABSTRACT

An optical imaging system includes a first lens, a second lens, a third lens, a fourth lens, a fifth lens, and a sixth lens. The first lens has a negative refractive power. The second lens has a negative refractive power. The third lens has a positive refractive power. The fourth lens has a positive refractive and an object-side surface that is concave in a paraxial region thereof. The fifth lens has a positive refractive power. The sixth lens has a negative refractive power. The first to sixth lenses are sequentially disposed in ascending numerical order from an object side of the optical imaging system toward an imaging plane of the optical imaging system. Two lenses that are adjacent to each other among the first to sixth lenses are cemented to each other to form a cemented lens.

19 Claims, 6 Drawing Sheets

(51) Int. Cl.
  *G02B 13/04* (2006.01)
  *G02B 13/18* (2006.01)
  *G02B 5/00* (2006.01)
  *G02B 5/20* (2006.01)

(58) Field of Classification Search
  USPC .................................................. 359/642–830
  See application file for complete search history.

(56) References Cited

U.S. PATENT DOCUMENTS

| | | | |
|---|---|---|---|
| 2006/0176576 A1* | 8/2006 | Nagahara | G02B 13/16 359/680 |
| 2008/0249367 A1 | 10/2008 | Miyano | |
| 2009/0219630 A1 | 9/2009 | Yamamoto | |
| 2012/0026602 A1 | 2/2012 | Uchida et al. | |
| 2012/0170142 A1 | 7/2012 | Hsieh et al. | |
| 2013/0021674 A1 | 1/2013 | Fujikura | |
| 2014/0015999 A1 | 1/2014 | Miyano | |
| 2014/0139931 A1* | 5/2014 | Kubota | G02B 9/60 359/740 |
| 2014/0240554 A1 | 8/2014 | Uchida et al. | |
| 2014/0368931 A1 | 12/2014 | Noda et al. | |
| 2015/0260952 A1 | 9/2015 | Tang et al. | |
| 2015/0370038 A1 | 12/2015 | Sun | |
| 2016/0139372 A1 | 5/2016 | Tanaka | |
| 2016/0178885 A1 | 6/2016 | Harada et al. | |
| 2017/0153419 A1 | 6/2017 | Hsieh et al. | |
| 2017/0184815 A1 | 6/2017 | Wang et al. | |
| 2019/0170969 A1* | 6/2019 | Liao | G02B 13/0045 |

FOREIGN PATENT DOCUMENTS

| | | | |
|---|---|---|---|
| CN | 105182505 A | 12/2015 | |
| CN | 105259638 A | 1/2016 | |
| CN | 106918890 A | 7/2017 | |
| JP | 2008-257108 A | 10/2008 | |
| JP | 2008257108 A * | 10/2008 | ........... G02B 23/243 |
| JP | 2011-145315 A | 7/2011 | |
| JP | 2014-15999 A | 1/2014 | |
| KR | 10-2010-0136832 A | 12/2010 | |
| KR | 10-2012-0071797 A | 7/2012 | |

OTHER PUBLICATIONS

U.S. Appl. No. 15/273,167, filed Sep. 22, 2016, Seong Ho Hwang et al., Samsung Electro-Mechanics Co., Ltd.

Korean Office Action dated Dec. 8, 2022, in counterpart Korean Patent Application No. 10-2016-0009149 (12 Pages in English, 7 Pages in Korean).

Korean Office Action dated Oct. 5, 2023, in counterpart Korean Patent Application No. 10-2023-0122673 (7 pages in English, 5 pages in Korean).

\* cited by examiner

| FIRST EXEMPLARY EMBODIMENT ||||||
| --- | --- | --- | --- | --- | --- |
| FOV = 120 | | f = 3.425 | | TTL = 14.001 | |
| SURFACE NO. | | RADIUS OF CURVATURE | THICKNESS /DISTANCE | EFFECTIVE RADIUS | REFRACTIVE INDEX | ABBE NUMBER |
| S0 | | infinity | | 3.56 | | |
| S1 | FIRST LENS | 11.7020 | 0.5000 | 3.000 | 1.589 | 61.2 |
| S2 | | 2.4500 | 1.2090 | 2.010 | | |
| S3 | SECOND LENS | 14.6080 | 0.5500 | 1.850 | 1.846 | 23.7 |
| S4 | | 2.8500 | 0.0000 | 1.540 | | |
| S5 | THIRD LENS | 2.8500 | 1.4060 | 1.540 | 1.901 | 31.6 |
| S6 | | -18.5090 | 0.0200 | 1.220 | | |
| S7 | STOP | infinity | 0.5570 | | | |
| S8* | FOURTH LENS | -5.0740 | 3.1030 | 1.380 | 1.693 | 53.1 |
| S9* | | -2.9430 | 0.1000 | 2.600 | | |
| S10 | FIFTH LENS | 5.9010 | 2.9680 | 3.050 | 1.691 | 54.7 |
| S11 | | -4.4720 | 0.0000 | 2.900 | | |
| S12 | SIXTH LENS | -4.4720 | 0.4000 | 2.900 | 1.922 | 20.8 |
| S13 | | 47.6080 | 0.5840 | 2.880 | | |
| S14 | FILTER | infinity | 0.4000 | 2.900 | 1.516 | 64.1 |
| S15 | | infinity | 1.2760 | 2.910 | | |
| S16 | COVER GLASS | infinity | 0.4000 | 2.950 | 1.516 | 64.1 |
| IMAGING PLANE | | infinity | 0.5280 | 2.960 | | |

FIG. 2

| ASP | S8 | S9 |
|---|---|---|
| K | 9.53550E+00 | 4.49140E-02 |
| A | 8.52649E-04 | 1.77496E-03 |
| B | 9.19000E-04 | -2.73148E-04 |
| C | -8.56383E-04 | 1.27528E-04 |
| D | 5.68840E-04 | -2.09860E-05 |
| E | 1.26671E-14 | 1.59479E-06 |
| F | 0.00000E+00 | 0.00000E+00 |
| G | 0 | 0.00000E+00 |
| H | 0 | 0.00000E+00 |

| SECOND EXEMPLARY EMBODIMENT | | | | | |
|---|---|---|---|---|---|
| FOV = 90 | | f = 3.887 | | TTL = 16.502 | |
| SURFACE NO. | | RADIUS OF CURVATURE | THICKNESS /DISTANCE | EFFECTIVE RADIUS | REFRACTIVE INDEX | ABBE NUMBER |
| S0 | | infinity | | 3.87 | | |
| S1 | FIRST LENS | 13.4500 | 0.5500 | 3.400 | 1.589 | 61.2 |
| S2 | | 2.8870 | 2.5200 | 2.460 | | |
| S3 | SECOND LENS | 8.1880 | 0.4000 | 2.140 | 1.546 | 23.7 |
| S4 | | 2.8000 | 0.0000 | 1.920 | | |
| S5 | THIRD LENS | 2.8000 | 1.6390 | 1.920 | 1.901 | 31.6 |
| S6 | | 61.0630 | 0.0200 | 1.690 | | |
| S7 | STOP | infinity | 0.9720 | | | |
| S8* | FOURTH LENS | -7.1110 | 3.0250 | 2.010 | 1.693 | 53.1 |
| S9* | | -3.9160 | 0.1000 | 3.200 | | |
| S10 | FIFTH LENS | 5.8460 | 3.0960 | 3.510 | 1.691 | 54.7 |
| S11 | | -6.3590 | 0.0000 | 3.310 | | |
| S12 | SIXTH LENS | -6.3590 | 0.4000 | 3.310 | 1.922 | 20.8 |
| S13 | | 25.0000 | 0.5710 | 3.170 | | |
| S14 | FILTER | infinity | 0.4000 | 3.160 | 1.516 | 64.1 |
| S15 | | infinity | 1.2760 | 3.140 | | |
| S16 | COVER GLASS | infinity | 0.4000 | 3.080 | 1.516 | 64.1 |
| IMAGING PLANE | | infinity | 1.1330 | 3.060 | | |

FIG. 5

| ASP | S8 | S9 |
|---|---|---|
| K | 4.28072E+00 | -4.13374E-01 |
| A | -2.27070E-03 | -4.24063E-04 |
| B | 1.11942E-03 | 3.19216E-05 |
| C | -7.13998E-04 | -1.75135E-05 |
| D | 1.77144E-04 | 1.83754E-06 |
| E | -1.71418E-05 | -9.39629E-08 |
| F | 0 | 0 |
| G | 0 | 0 |
| H | 0 | 0 |

OPTICAL IMAGING SYSTEM

CROSS-REFERENCE TO RELATED APPLICATIONS

This application is a continuation of application Ser. No. 15/273,167 filed on Sep. 22, 2016, and claims the benefit under 35 USC 119(a) of Korean Patent Application No. 10-2016-0009149 filed on Jan. 26, 2016, in the Korean Intellectual Property Office, the entire disclosures of which are incorporated herein by reference for all purposes.

BACKGROUND

1. Field

The following description relates to an optical imaging system mounted in a monitoring camera as a sensor.

2. Description of Related Art

A small monitoring camera is mounted in a vehicle to image or provide a visual representation of a front visual field and a rear visual field of the vehicle. For example, a small monitoring camera is mounted on a rearview mirror of the vehicle to image, record, or visually represent moving vehicles, pedestrians, and landscape in front of the vehicle.

Such a small monitoring camera does not simply image objects in front of and behind the vehicle, but may be used as a sensor, recognizing presence of objects in front of and behind the vehicle. In this regard, a monitoring camera used as a sensor should be able to sense fine movement. However, the monitoring camera used as a sensor would need to be of high level resolution. As a result, the monitoring camera may be easily overheat due to having the high level of resolution.

Therefore, there is a need to develop an optical imaging system having a constant and a high level of resolution, even at high temperature, so as to be mounted in the monitoring camera as a sensor, as described above.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure may provide an optical imaging system having a constant and a high level of resolution at a high temperature.

In accordance with an embodiment, an optical imaging system includes a first lens having a negative refractive power; a second lens having a negative refractive power; a third lens having a positive refractive power; a fourth lens having a positive refractive power and an object-side surface that is concave in a paraxial region thereof; a fifth lens having a positive refractive power; and a sixth lens having a negative refractive power, wherein the first to sixth lenses are sequentially disposed in ascending numerical order from an object side of the optical imaging system toward an imaging plane of the optical imaging system, and two lenses that are adjacent to each other among the first to sixth lenses are cemented to each other to form a cemented lens.

An object-side surface of the first lens may be convex in a paraxial region thereof, and an image-side surface of the first lens may be concave in a paraxial region thereof.

An object-side surface of the second lens may be convex in a paraxial region thereof, and an image-side surface of the second lens may be concave in a paraxial region thereof.

An object-side surface of the third lens may be convex in a paraxial region thereof.

An image-side surface of the third lens may be convex in a paraxial region thereof.

An image-side surface of the third lens may be concave in a paraxial region thereof.

An image-side surface of the fourth lens may be convex in a paraxial region thereof.

An object-side surface of the fifth lens may be convex in a paraxial region thereof, and an image-side surface of the fifth lens may be convex in a paraxial region thereof.

An object-side surface of the sixth lens may be concave in a paraxial region thereof, and an image-side surface of the sixth lens may be concave in a paraxial region thereof.

The second lens and the third lens may be cemented to each other.

The fifth lens and the sixth lens may be cemented to each other.

The fourth lens may be made of glass.

Either one or both of the object-side surface of the fourth lens and an image-side surface of the fourth lens may have an aspherical shape.

The fifth lens may have a largest effective radius among the first to sixth lenses.

10 mm<|R13| may be satisfied, where R13 is a radius of curvature of an image-side surface of the sixth lens in a paraxial region thereof.

The optical imaging system may further include a stop disposed between the third lens and the fourth lens.

The optical imaging system may further include a filter and a cover glass both disposed between the sixth lens and the imaging plane.

A radius of curvature of an image-side surface of the second lens and a radius of curvature of an object-side surface of the third lens may be substantially the same.

A radius of curvature of an image-side surface of the fifth lens and a radius of curvature of an object-side surface of the sixth lens may be substantially the same.

In accordance with another embodiment, an optical imaging system includes a first lens, a second lens, a third lens, a fourth lens, a fifth lens, and a sixth lens sequentially disposed in ascending numerical order from an object side of the optical imaging system toward an imaging plane of the optical imaging system, wherein three lenses of the first to sixth lenses each have a positive refractive power, three other lenses of the first to sixth lenses each have a negative refractive power, two lenses that are adjacent to each other among the first to sixth lenses are cemented to each other to form a first cemented lens, two other lenses that are adjacent to each other among the first to sixth lenses are cemented to each other to form a second cemented lens, the two lenses forming the first cemented lens have refractive powers having signs that are opposite to each other, and the other two lenses forming the second cemented lens have refractive powers having signs that are opposite to each other.

Other features and aspects will be apparent from the following detailed description, the drawings, and the claims.

BRIEF DESCRIPTION OF DRAWINGS

FIG. 2 is a table showing characteristics of lenses of the optical imaging system illustrated in FIG. 1.

FIG. 5 is a table showing characteristics of lenses of the optical imaging system illustrated in FIG. 4.

Throughout the drawings and the detailed description, the same reference numerals refer to the same elements. The relative size and depiction of elements in the drawings may be exaggerated for clarity, illustration, and convenience.

DETAILED DESCRIPTION

Figure 1:
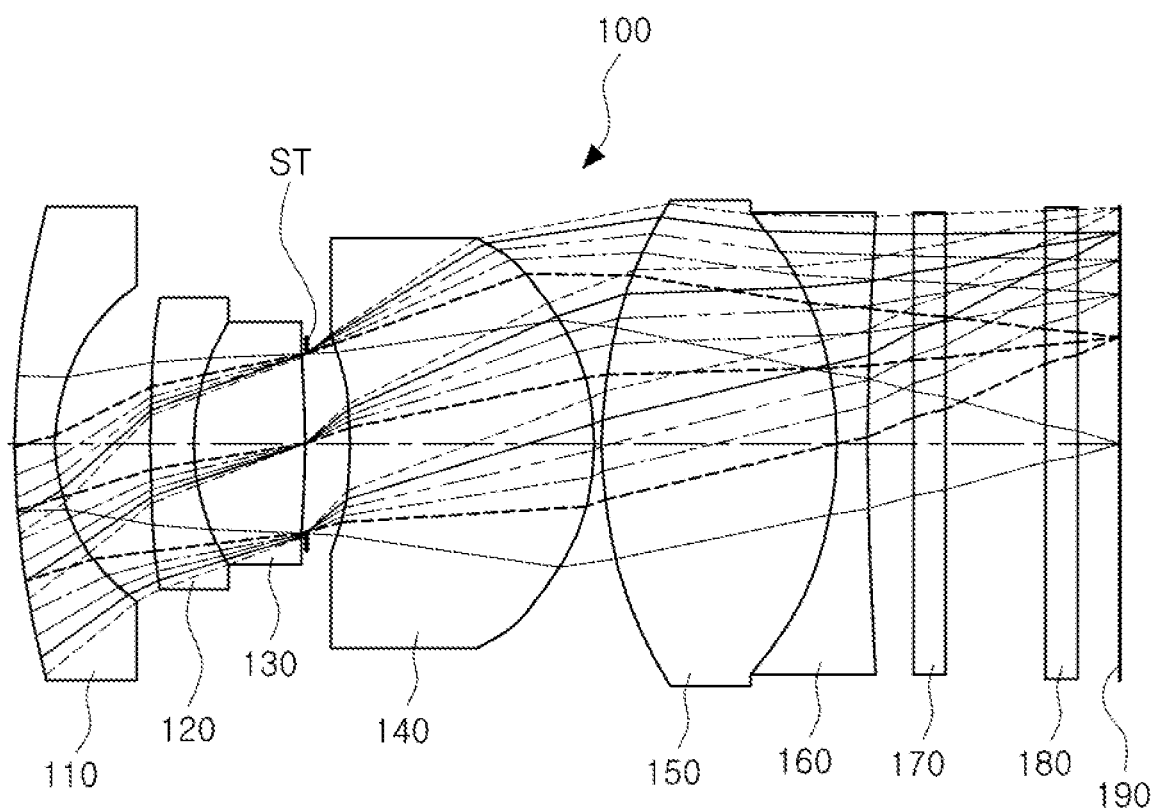
FIG. 1 is a view of an optical imaging system according to a first embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure after an understanding of the disclosure of this application.

It will be understood that, although the terms first, second, third, etc., may be used herein to describe various lenses, these lenses should not be limited by these terms. These terms are only used to distinguish one lens from another lens. These terms do not necessarily imply a specific order or arrangement of the lenses. Thus, a first lens discussed below could be termed a second lens without departing from the teachings of the various embodiments.

In addition, a surface of each lens closest to an object is referred to as a first surface or an object-side surface, and a surface of each lens closest to an imaging plane is referred to as a second surface or an image-side surface.

In the present specification, all radii of curvature, thicknesses, distances between elements, distances from the first surface of the first lens to the imaging plane (TTLs), distances between a stop and the imaging plane (SLs), image heights (IMGHs), and back focus lengths (BFLs) of the lenses, an overall focal length of an optical imaging system, and a focal length of each lens are indicated in millimeters (mm), although other units may be used to express these quantities. Furthermore, thicknesses of lenses, distances between the lenses, TTLs, and SLs are distances measured based on an optical axis of the lenses.

In embodiments of an optical imaging system, shapes of lenses are described and illustrated in relation to optical axis portions of the lenses.

A statement that a surface of a lens is convex means that an optical axis portion of the surface is convex, and statement that a surface of a lens is concave means that an optical axis portion of the surface is concave. Therefore, in a configuration in which one surface of a lens is described as being convex, an edge portion of the surface of the lens may be concave. Likewise, in a configuration in which one surface of a lens is described as being concave, an edge portion of the surface of the lens may be convex. In other words, a paraxial region of a lens may be convex, while a portion of the lens outside the paraxial region may be convex, concave, or flat. Furthermore, a paraxial region of a lens may be concave, while a portion of the lens outside the paraxial region may be convex, concave, or flat.

In embodiments of an optical imaging system, thicknesses and radii of curvatures of lenses are measured in relation to optical axes of the corresponding lenses.

An optical imaging system according to an embodiment includes six lenses. As an example, the optical imaging system may include a first lens, a second lens, a third lens, a fourth lens, a fifth lens, and a sixth lens. The optical imaging system may include from four lenses up to six lenses without departing from the scope of the embodiments herein described. The embodiments of an optical imaging system described herein include six lenses having a refractive power. However, after an understanding of the disclosure of this application, it will be appreciated that the number of lenses in the optical imaging system may vary, for example, between two to six lenses, while achieving the various results and benefits described below. Also, although each lens is described as having a particular refractive power, a different refractive power for at least one of the lenses may be used to achieve the intended result.

In embodiments of an optical imaging, the first to sixth lenses are made of materials including glass, plastic, or other similar types of polycarbonate materials. In some embodiments, at least one of the first through sixth lenses is made of a material different from the materials forming the other ones of the first through sixth lenses.

In the present disclosure, a first lens refers to a lens closest to an object (or a subject), while a sixth lens refers to a lens closest to an imaging plane (or an image sensor). Furthermore, thicknesses of the lenses, distances between the lenses, and TTL are distances measured on the basis of optical axes of the lenses.

An optical imaging system includes six lenses. Next, configurations of the respective lenses described above will be described.

The first lens has a refractive power, such as a positive refractive power or a negative refractive power. For example, the first lens has a negative refractive power.

One surface of the first lens is concave. For example, an image-side surface of the first lens is concave.

The first lens may have a spherical surface. For example, both surfaces of the first lens are spherical. The first lens may be made of a material having high light transmissivity and excellent workability. For example, the first lens may be made of glass. However, a material of the first lens is not limited thereto. For example, the first lens instead may be made of plastic.

The first lens has a predetermined refractive index. For example, a refractive index of the first lens is 1.60 or less. The first lens may have a relatively high Abbe number. For example, an Abbe number of the first lens may be 60 or more.

The second lens has a refractive power, such as a positive refractive power or a negative refractive power. For example, the second lens has a negative refractive power.

One surface of the second lens is concave. For example, an image-side surface of the second lens is concave.

The second lens may have a spherical surface. For example, both surfaces of the second lens are spherical. The second lens may be made of a material having high light transmissivity and excellent workability. For example, the second lens is made of glass. However, a material of the second lens is not limited thereto. For example, the second lens may be made of plastic instead of glass.

The second lens may have a refractive index higher than that of the first lens. For example, a refractive index of the second lens is 1.80 or more. The second lens may have an Abbe number lower than that of the first lens. For example, an Abbe number of the second lens is 25 or less.

The third lens may have a refractive power, such as a positive refractive power or a negative refractive power. For example, the third lens may have a positive refractive power.

One surface of the third lens may be convex. For example, an object-side surface of the third lens is convex.

The third lens may have a spherical surface. For example, both surfaces of the third lens are spherical. The third lens may be made of a material having high light transmissivity and excellent workability. For example, the third lens is made of glass. However, a material of the third lens is not limited thereto. For example, the third lens may be made of plastic instead of glass.

The third lens may have a refractive index higher than that of the first lens. For example, a refractive index of the third lens is 1.90 or more. The third lens may have an Abbe number higher than that of the second lens. For example, an Abbe number of the third lens is 30 or more.

The fourth lens may have a refractive power, such as a positive refractive power or a negative refractive power. For example, the fourth lens has a positive refractive power.

One surface of the fourth lens may be concave. For example, an object-side surface of the fourth lens is concave.

The fourth lens may have an aspherical surface. For example, both surfaces of the fourth lens are aspherical. The fourth lens may be made of a material having high light transmissivity and excellent workability. For example, the fourth lens is made of glass. However, a material of the fourth lens is not limited thereto. For example, the fourth lens may be made of plastic instead of glass.

The fourth lens may have a refractive index lower than that of the third lens. For example, a refractive index of the fourth lens is less than 1.80. The fourth lens may have an Abbe number lower than that of the first lens. For example, an Abbe number of the fourth lens is 55 or less.

The fifth lens may have a refractive power, such as a positive refractive power or a negative refractive power. For example, the fifth lens has a positive refractive power.

At least one surface of the fifth lens may be convex. For example, both surfaces of the fifth lens are convex.

The fifth lens may have a spherical surface. For example, both surfaces of the fifth lens are spherical. The fifth lens may be made of a material having high light transmissivity and excellent workability. For example, the fifth lens is made of glass. However, a material of the fifth lens is not limited thereto. For example, the fifth lens may be made of plastic instead of glass.

The fifth lens may have a refractive index substantially similar to that of the fourth lens. For example, a refractive index of the fifth lens is less than 1.80. The fifth lens may have an Abbe number lower than that of the first lens. For example, an Abbe number of the fifth lens is less than 60.

The sixth lens may have a refractive power, such as a positive refractive power or a negative refractive power. For example, the sixth lens has a negative refractive power.

At least one surface of the sixth lens may be concave. For example, both surfaces of the sixth lens are concave. Alternatively, an image-side surface of the sixth lens is flat or substantially flat.

The sixth lens may have a spherical surface. For example, both surfaces of the sixth lens are spherical. The sixth lens may be formed of a material having high light transmissivity and excellent workability. For example, the sixth lens is made of glass. However, a material of the sixth lens is not limited thereto. For example, the sixth lens may be made of plastic instead of glass.

The sixth lens may have a refractive index higher than the refractive indexes of the first to fifth lenses. For example, a refractive index of the sixth lens may be 1.90 or more. The sixth lens may have an Abbe number lower than that of the second lens. For example, an Abbe number of the sixth lens may be 23 or less.

At least one of the first to sixth lenses may have an aspherical shape. For example, the fourth lens has an aspherical shape. An aspherical surface of the fourth lens may be represented by the following Equation 1:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} \tag{1}$$

In Equation 1, c is an inverse of a radius of curvature of the lens, k is a conic constant, r is a distance from a certain point on an aspherical surface of the lens to an optical axis, A to J are aspherical constants, and Z (or SAG) is a distance between the certain point on the aspherical surface of the lens at the distance r and a tangential plane meeting an apex of the aspherical surface of the lens.

The optical imaging system may include an image sensor. The image sensor may be configured to realize a high level of resolution. For example, a unit size of pixels configuring the image sensor may be 1.12 μm or less. A surface of the image sensor forms an imaging plane on which an image is formed.

The optical imaging system may include a stop. The stop may be disposed between lenses. For example, the stop is disposed between the third and fourth lenses. In another example, the stop is disposed in front of an object-side surface of the first lens. The stop adjusts an amount of light incident to the image sensor. The stop is configured to bisect the refractive power of the optical imaging system. For example, the overall refractive power of lenses positioned in front of the stop (that is, positioned adjacent to the object side) may be negative, and the overall refractive power of lenses positioned behind the stop (that is, positioned adjacent to the imaging plane side) may be positive. This structure may be advantageous, for example, by increasing a field of view of the optical imaging system and decreasing an overall length of the optical imaging system.

The optical imaging system may include a filter. The filter may be disposed between the sixth lens and the image sensor, and may filter components that decrease a resolution of the optical imaging system. For example, the filter may filter light having an infrared wavelength.

The optical imaging system may also include a cover glass. The cover glass may be disposed between the sixth lens and the image sensor, and may alleviate a phenomenon in which a resolution of the optical imaging system is decreased due to foreign materials. For example, the cover glass is formed directly on the surface of the image sensor.

The optical imaging system satisfies the following conditional expressions:

$$90° \leq FOV \quad \text{(Conditional Expression 1)}$$

$$10 \text{ mm} < |R13| \quad \text{(Conditional Expression 2)}$$

FOV is a maximum field of view of the optical imaging system, and R13 is a radius of curvature of an image-side surface of the sixth lens.

Next, optical imaging systems according to embodiments will be described.

First, an optical imaging system according to a first embodiment will be described with reference to FIG. 1.

Referring to FIG. 1, an optical imaging system 100 includes a plurality of lenses having a refractive power. For example, the optical imaging system 100 includes a first lens 110, a second lens 120, a third lens 130, a fourth lens 140, a fifth lens 150, and a sixth lens 160.

The first lens 110 has a negative refractive power, an object-side surface thereof is convex, and an image-side surface thereof is concave. The second lens 120 has a negative refractive power, an object-side surface thereof is convex, and an image-side surface thereof is concave. The third lens 130 has a positive refractive power, an object-side surface thereof is convex, and an image-side surface thereof is convex. The fourth lens 140 has a positive refractive power, an object-side surface thereof is concave, and an image-side surface thereof is convex. The fifth lens 150 has a positive refractive power, an object-side surface thereof is convex, and an image-side surface thereof is convex. The sixth lens 160 has a negative refractive power, an object-side surface thereof is concave, and an image-side surface thereof is concave.

In one example, all of the first to sixth lenses are made of glass. The fourth lens of the first to sixth lenses have an aspherical shape, while the other lenses of the first to sixth lenses have a spherical shape.

The second lens 120 may be cemented, bonded, adhered, directly connected, or operatively connected to the third lens 130. For example, an image-side surface S4 of the second lens 120 is partially, substantially, or entirely cemented, bonded, adhered, directly connected, or operatively connected to an object-side surface S5 of the third lens 130. To this end, a radius of curvature of the image-side surface of the second lens and a radius of curvature of the object-side surface of the third lens are the same, equivalent, or substantially the same. In one configuration, cementing, bonding, adhering, directly connecting, or operatively connecting is performed by joining securely the lenses to each other, typically by using an adhesive substance, heat, or pressure.

The fifth lens 150 may be cemented, bonded, adhered, directly connected, or operatively connected to the sixth lens 160. For example, an image-side surface S11 of the fifth lens 150 is partially, substantially, or entirely cemented, bonded, adhered, directly connected, or operatively connected to an object-side surface S12 of the sixth lens 160. To this end, a radius of curvature of the image-side surface of the fifth lens 150 and a radius of curvature of the object-side surface of the sixth lens 160 may be the same, equivalent, or substantially the same.

Figures 3, 4:
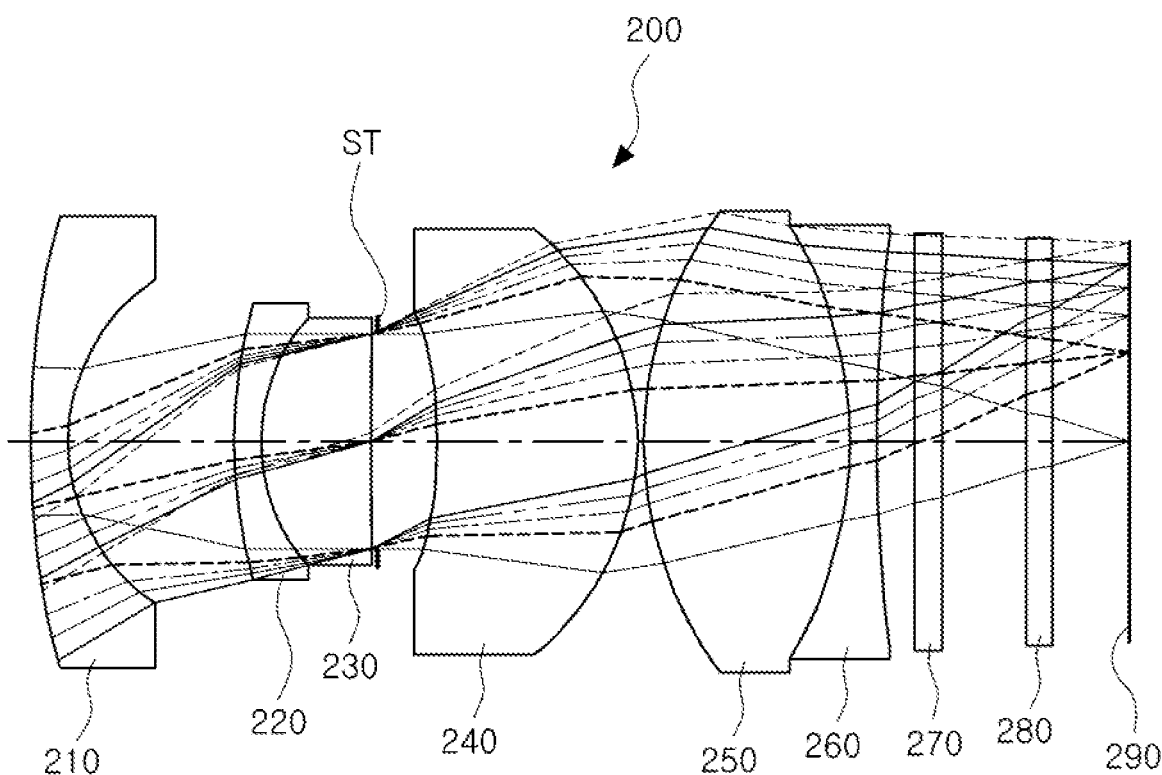
FIG. 3 is a table showing aspherical characteristics of a fourth lens of the optical imaging system illustrated in FIG. 1.
FIG. 4 is a view of an optical imaging system according to a second embodiment.

FIG. 2 is a table showing characteristics of the lenses of the optical imaging system configured as described. FIG. 3 is a table showing aspherical characteristics of the fourth lens.

The optical imaging system 100 includes a stop ST. In one example, the stop ST is disposed between the third lens 130 and the fourth lens 140. For example, the stop ST is disposed between the image-side surface of the third lens 130 and the object-side surface of the fourth lens 140.

The optical imaging system 100 includes a filter 170 and a cover glass 180. The filter 170 and the cover glass 180 are disposed between the sixth lens 160 and an image sensor 190. The filter 170 filters infrared light, and the cover glass 180 protects the image sensor 190.

The optical imaging system 100 includes the image sensor 190. The image sensor 190 forms an imaging plane on which an image of light refracted through the lenses is formed.

An optical imaging system according to a second embodiment will be described with reference to FIG. 4.

Referring to FIG. 4, an optical imaging system 200 includes a plurality of lenses having a refractive power. For example, the optical imaging system 200 includes a first lens 210, a second lens 220, a third lens 230, a fourth lens 240, a fifth lens 250, and a sixth lens 260.

The first lens 210 has a negative refractive power, an object-side surface thereof is convex, and an image-side surface thereof is concave. The second lens 220 has a negative refractive power, an object-side surface thereof is convex, and an image-side surface thereof is concave. The third lens 230 has a positive refractive power, an object-side surface thereof is convex, and an image-side surface thereof is concave. The fourth lens 240 has a positive refractive power, an object-side surface thereof is concave, and an image-side surface thereof is convex. The fifth lens 250 has a positive refractive power, an object-side surface thereof is convex, and an image-side surface thereof is convex. The sixth lens 260 has a negative refractive power, an object-side surface thereof is concave, and an image-side surface thereof is concave.

In one example, all of the first to sixth lenses are made of glass. The fourth lens of the first to sixth lenses have an aspherical shape, and the other lenses of the first to sixth lenses have a spherical shape.

The second lens 220 may be cemented, bonded, adhered, directly connected, or operatively connected to the third lens 230. For example, an image-side surface S4 of the second lens 220 is partially, substantially, or entirely cemented, bonded, adhered, directly connected, or operatively connected to an object-side surface S5 of the third lens 230. To this end, a radius of curvature of the image-side surface of the second lens and a radius of curvature of the object-side surface of the third lens are the same, equivalent, or substantially the same.

The fifth lens 250 may be cemented, bonded, adhered, directly connected, or operatively connected to the sixth lens 260. For example, an image-side surface S11 of the fifth lens 250 is partially, substantially, or entirely cemented, bonded, adhered, directly connected, or operatively connected to an object-side surface S12 of the sixth lens 260. To this end, a radius of curvature of the image-side surface of the fifth lens 250 and a radius of curvature of the object-side surface of the sixth lens 260 may be the same, equivalent, or substantially the same.

Figures 6, 7:
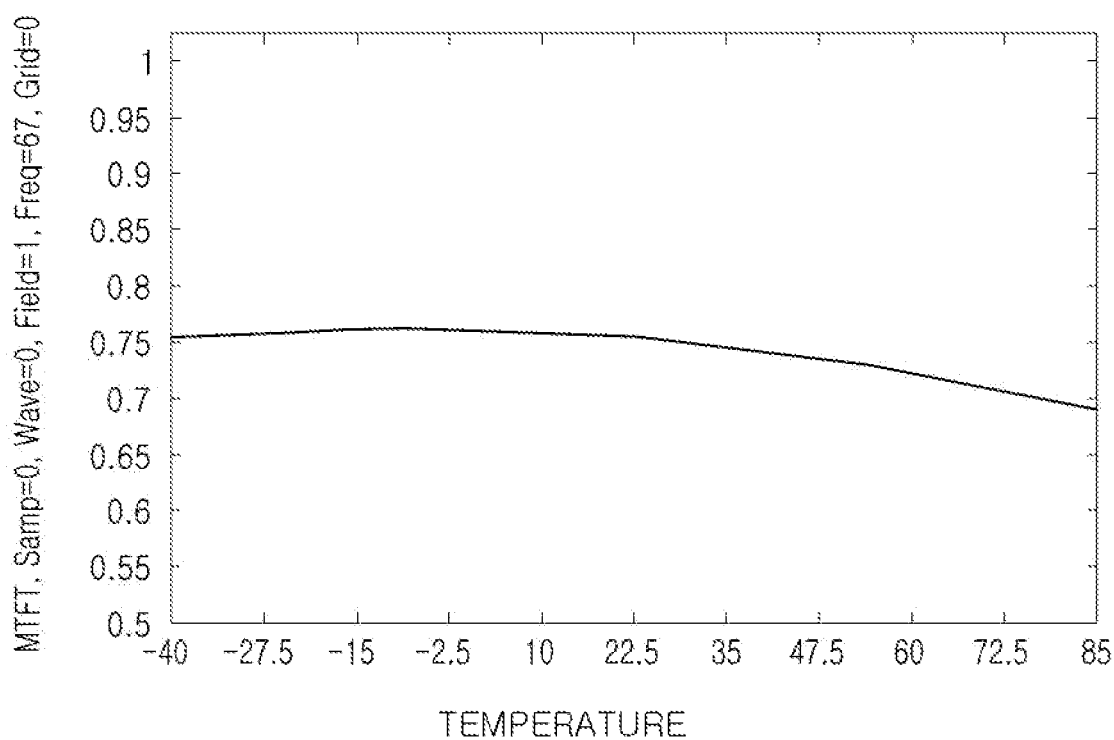
FIG. 6 is a table showing aspherical characteristics of a fourth lens of the optical imaging system illustrated in FIG. 4.
FIG. 7 is a graph representing a modulation transfer function (MTF) change of the optical imaging system illustrated in FIG. 1 based on a temperature.

FIG. 5 is a table showing characteristics of the lenses of the optical imaging system configured as described above. FIG. 6 is a table showing aspherical characteristics of the fourth lens.

The optical imaging system 200 includes a stop ST. The stop ST is disposed between the third lens 230 and the fourth lens 240. For example, the stop ST is disposed between the image-side surface of the third lens 230 and the object-side surface of the fourth lens 240.

The optical imaging system 200 includes a filter 270 and a cover glass 280. The filter 270 and the cover glass 280 are disposed between the sixth lens 260 and an image sensor 290. The filter 270 filters infrared light, and the cover glass 280 protects the image sensor 290.

The optical imaging system 200 includes the image sensor 290. The image sensor 290 forms an imaging plane on which an image of light refracted through the lenses is formed.

As an illustrative and non-limiting example, Table 1 below shows optical characteristics of the optical imaging systems according to the first and second embodiments. An overall focal length (f) of the optical imaging system is determined to be substantially in a range of 3.3 to 4.1. In the optical imaging system, a focal length (f1) of the first lens is determined to be substantially in a range of −7.3 to −4.3. In the optical imaging system, a focal length (f2) of the second lens is determined to be substantially in a range of −6.2 to −3.2. In the optical imaging system, a focal length (f3) of the third lens is determined to be substantially in a range of 1.8 to 4.2. In the optical imaging system, a focal length (f4) of the fourth lens is determined to be substantially in a range of 5.3 to 10.1. In the optical imaging system, a focal length (f5) of the fifth lens is determined to be substantially in a range of 3.1 to 5.9. In the optical imaging system, a focal length (f6) of the sixth lens is determined to be substantially in a range of −6.5 to −3.4. In the optical imaging system, TTL is substantially determined to be in a range of 13.0 to 17.5.

TABLE 1

| Quantity | First Embodiment | Second Embodiment |
| --- | --- | --- |
| f | 3.4249 | 3.8868 |
| f1 | −5.3686 | −6.3640 |
| f2 | −4.2770 | −5.2068 |
| f3 | 2.8294 | 3.2142 |
| f4 | 6.3355 | 9.0640 |
| f5 | 4.1691 | 4.9176 |
| f6 | −4.4176 | −5.4650 |
| TTL | 14.001 | 16.502 |
| FOV | 120.0° | 90.0° |

In addition, because a plurality of spherical lenses are used in the optical imaging system configured as described above, the cost required to manufacture the optical imaging system is reduced. The optical imaging system according to the embodiments described above is configured to significantly decrease a change in a focal length depending on a temperature by significantly decreasing the refractive powers of the lenses.

Figure 8:
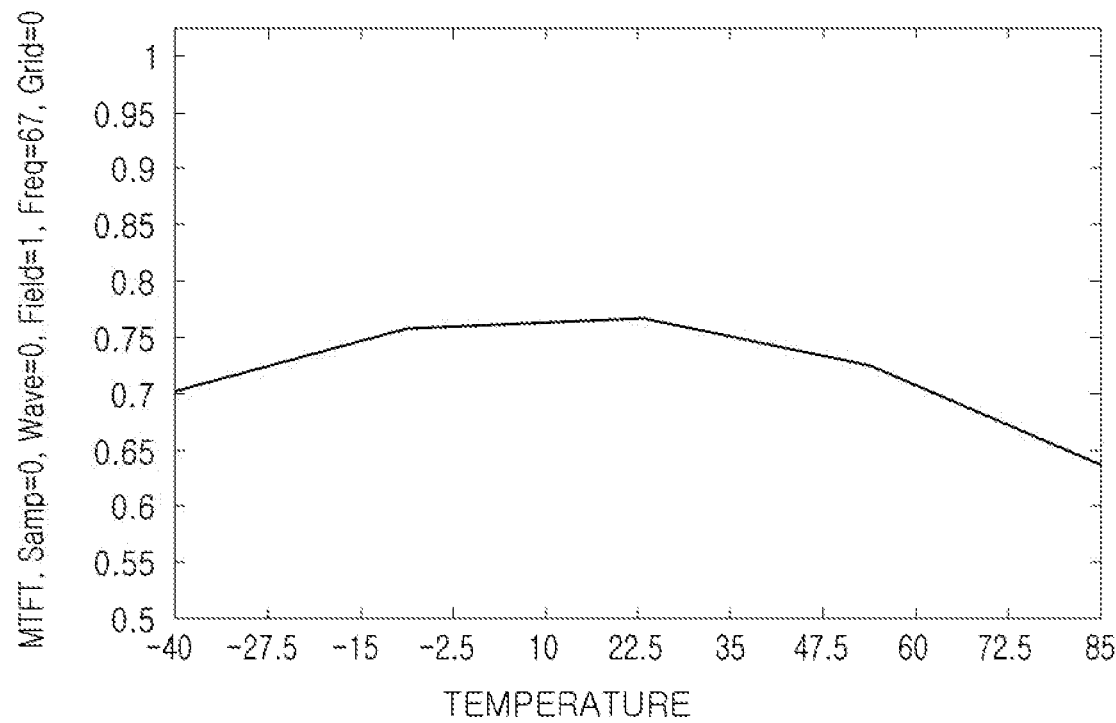
FIG. 8 is a graph representing an MTF change of the optical imaging system illustrated in FIG. 4 based on a temperature.

The optical imaging system according to the embodiments described above maintains a constant level of resolution at a high temperature. FIGS. 7 and 8 are graphs representing modulation transfer function (MTF) changes of the optical imaging systems according to the first and second embodiments depending on, i.e., as a function of, a temperature.

In the optical imaging system according to the first embodiment, an MTF value was in a range of 0.75 to 0.72 in a temperature range of 10° C. to 60° C. In the optical imaging system according to the second embodiment, an MTF value was in a range of 0.71 to 0.75 in a temperature range of 10° C. to 60° C. Thus, the optical imaging systems according to first and second embodiments have a substantially constant level of resolution in the temperature range of 10° C. to 60° C. Therefore, the optical imaging system according to the first and second embodiments realize a high level of resolution even in an environment in which a range of temperature change is large, such as the interior of a vehicle.

Figure 9:
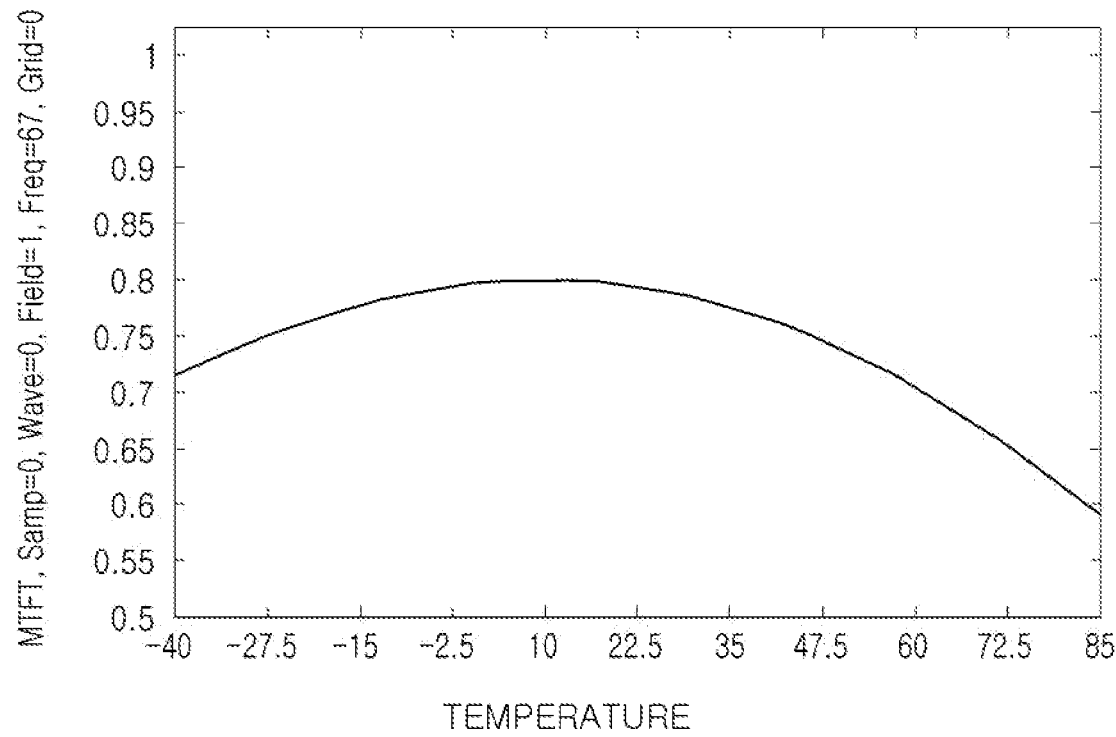
FIG. 9 is a graph representing an MTF change of other optical imaging systems based on a temperature.

On the other hand, in other optical imaging systems, MTF values were in the range of 0.7 to 0.8 in a temperature range of 10° C. to 60° C. as illustrated in FIG. 9. Thus, the change in resolution is large in the temperature range of 10° C. to 60° C. in such other optical imaging systems.

Therefore, in the optical imaging systems according to the embodiments described above, a high level of resolution is realized even in a high temperature environment.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
   a first lens having a negative refractive power;
   a second lens having a negative refractive power and a convex object-side surface in a paraxial region thereof;
   a third lens having a positive refractive power;
   a fourth lens having a positive refractive power and an object-side surface that is concave in a paraxial region thereof;
   a fifth lens having a positive refractive power;
   a sixth lens having a negative refractive power and an image-side surface that is concave in a paraxial region thereof, and a refractive index that is larger than the refractive indices of each of the first through fifth lenses,
   wherein the first to sixth lenses are sequentially disposed in ascending numerical order from an object side of the optical imaging system toward an imaging plane of the optical imaging system,
   two lenses that are adjacent to each other among the first to sixth lenses are cemented to each other to form a cemented lens, and TTL is in a range of 13.0 to 17.5, where TTL is a distance along an optical axis from an object-side surface of the first lens to the imaging plane.

2. The optical imaging system of claim 1, wherein the object-side surface of the first lens is convex in a paraxial region thereof, and an image-side surface of the first lens is concave in a paraxial region thereof.

3. The optical imaging system of claim 1, wherein an image-side surface of the second lens is concave in a paraxial region thereof.

4. The optical imaging system of claim 1, wherein an object-side surface of the third lens is convex in a paraxial region thereof.

5. The optical imaging system of claim 4, wherein an image-side surface of the third lens is convex in a paraxial region thereof.

6. The optical imaging system of claim 4, wherein an image-side surface of the third lens is concave in a paraxial region thereof.

7. The optical imaging system of claim 1, wherein an image-side surface of the fourth lens is convex in a paraxial region thereof.

8. The optical imaging system of claim 1, wherein an object-side surface of the fifth lens is convex in a paraxial region thereof, and an image-side surface of the fifth lens is convex in a paraxial region thereof.

9. The optical imaging system of claim 1, wherein an object-side surface of the sixth lens is concave in a paraxial region thereof.

10. The optical imaging system of claim 1, wherein the second lens and the third lens are cemented to each other.

11. The optical imaging system of claim 1, wherein the fifth lens and the sixth lens are cemented to each other.

12. The optical imaging system of claim 1, wherein the fourth lens is made of glass.

13. The optical imaging system of claim 1, wherein either one or both of the object-side surface of the fourth lens and an image-side surface of the fourth has an aspherical shape.

14. The optical imaging system of claim 1, wherein the fifth lens has a largest effective radius among the first to sixth lenses.

15. The optical imaging system of claim 1, wherein 10 mm<|R13| is satisfied, where R13 is a radius of curvature of an image-side surface of the sixth lens in a paraxial region thereof.

16. The optical imaging system of claim 1, further comprising a stop disposed between the third lens and the fourth lens.

17. The optical imaging system of claim 1, further comprising a filter and a cover glass both disposed between the sixth lens and the imaging plane.

18. The optical imaging system of claim 1, wherein a radius of curvature of an image-side surface of the second lens and a radius of curvature of an object-side surface of the third lens are substantially the same.

19. The optical imaging system of claim 1, wherein a radius of curvature of an image-side surface of the fifth lens and a radius of curvature of an object-side surface of the sixth lens are substantially the same.

* * * * *